Nov. 9, 1937.　　　C. B. KENNEDY　　　2,098,423
COUPLING DEVICE
Filed July 3, 1936
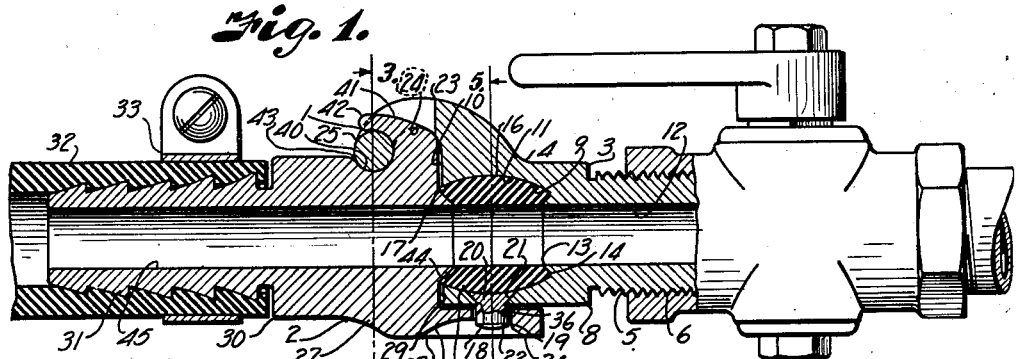
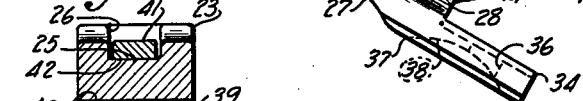
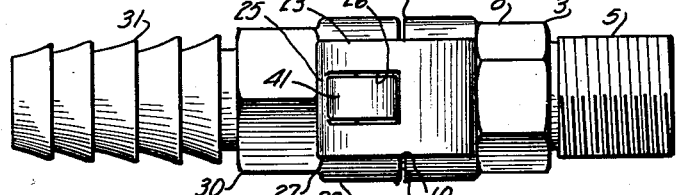
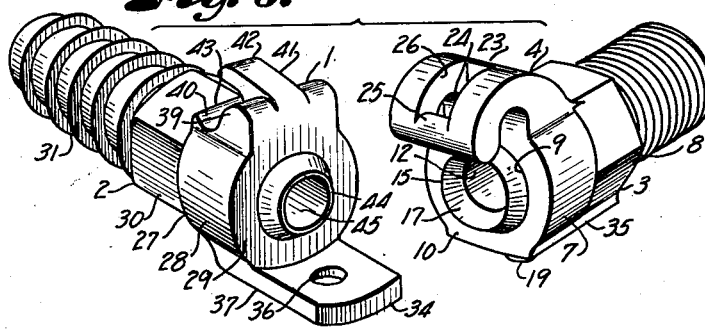
INVENTOR
Chester B. Kennedy
BY
ATTORNEY Patented Nov. 9, 1937

2,098,423

UNITED STATES PATENT OFFICE 2,098,423

COUPLING DEVICE

Chester B. Kennedy, Junction City, Kans.

Application July 3, 1936, Serial No. 88,774

7 Claims. (Cl. 285—110)

This invention relates to coupling devices, for example those of the character employed in coupling sections of hose, or a hose to a pipe connection, and has for its principal object to provide a coupling of this character which is connected and disconnected without the use of tools.

It is a further object of the invention to provide a quick acting coupling that is locked in coupled condition incidental to pressure of fluid flowing therethrough.

In accomplishing these and other objects of the invention, as hereinafter pointed out, I have provided improved details of structure, the preferred form of which is illustrated in the accompanying drawing, wherein:

Fig. 1 is a longitudinal section through a coupling embodying the features of the present invention and which is shown as employed in connecting a hose with a pipe fitting.

Fig. 2 is a plan view of the coupling showing the parts thereof being moved from engaging relation.

Fig. 3 is a cross-section through the coupling on the line 3—3 of Fig. 1.

Fig. 4 is a plan view of the coupling showing the parts thereof in interlocked engagement.

Fig. 5 is a cross-section on the line 5—5 of Fig. 1.

Fig. 6 is a detail perspective view of the parts of the coupling shown in disassembled spaced relation to better illustrate the interlocking features thereof.

Referring more in detail to the drawing:

1 designates a quick action coupling constructed in accordance with the present invention and which includes interlocking members 2 and 3. In the illustrated instance the member 3 includes a head portion 4 having a threaded shank 5 for connecting the member within the internally threaded end of a shut-off valve or other pipe fitting as indicated at 6. The head 4 includes a cylindrical portion 7 at the end opposite the shank 5 and an intermediate polygonal shaped portion 8 whereby a wrench may be applied to screw the shank into the fitting 6.

Formed within the head 4 is a packing chamber 9 opening inwardly from the end 10 of the head 4. The packing chamber 9 has an arcuate inner face 11 extending circumferentially of the flow channel 12 that extends through the shank and the polygonal shaped portion of the head. The inner end of the recess is of substantially larger diameter than the channel to provide an encircling V-shaped rib 13 for interengaging a corresponding shaped end 14 of a compressible packing ring 15. The packing ring 15 has a rounded periphery 16 closely engaging the rounded contour of the recess. The inner diameter of the packing ring preferably conforms to the inner diameter of the flow channel to form a smooth continuation thereof when the packing is in position within the coupling member. The outer end of the packing ring extends slightly beyond the face 10 of the coupling member and has a tapered seating portion 17 to be engaged by a centering rib on the other coupling member, later described.

Extending through an opening 18 in the side wall of the coupling member at a point substantially midway of the packing recess, is a locking pin 19 having a head 20 engaging in a tapered counter-bore 21 whereby the head forms a smooth continuation of the packing recess, and is closely engaged by the packing ring in such a manner that the inherent expansibility of the packing retains the shank 22 of the locking pin 19 in projected position.

Formed on the head 4 diametrically opposite the locking pin is a hook-like arm 23 of substantially arcuate shape to provide a rounded seat 24 offset outwardly from the body of the coupling member. The free end of the arm terminates in a semicylindrical bar portion 25 extending across an opening 26 that is formed in the hook-shaped arm. The bar portion thus cooperates with the portions of the arm at the sides of the opening to form a loop adapted to be engaged by a hooked tongue on the other coupling member now to be described.

The coupling member 2 includes a head 27 having a cylindrical portion 28 provided with an end 29 adapted to abut against an end 10 of the other coupling member when the parts are in intercoupled position. The head also includes a polygonal shaped portion 30 terminating in an externally grooved nipple 31 that is adapted to engage within a hose 32 to interconnect the hose with the coupling member. To insure retention of the hose, the end thereof extending over the nipple may be provided with a suitable clamp as indicated at 33, to contract the hose and press it within the annular grooves of the nipple.

The cylindrical portion of the coupling member has an offset lock pin engaging portion or lug 34 extending in parallel relation with the axis of the coupling member and which is adapted to overlap a flattened boss 35 on the other coupling member to cooperate with the locking pin 19. The lug 34 has on opening 36 therein to engage over the shank 22 of the locking pin 19 when the parts are in coupled position. The outer face 37 of the lug has a concavity 38 therein to permit projection of the locking pin so that the locking pin may be engaged by the thumb and pressed retractively through the opening 36 a sufficient distance for disengaging the coupling members as later described. The concavity is preferably off center relatively to the pin 22 in the direction of the body portion of the coupling so that a better holding edge is provided for the pin, and a deeper depression for the thumb, thereby facilitating the release and at the same time enhancing the security of the lock.

Formed on the opposite side of the coupling member 2 is a transverse rib shaped boss 39 that is adapted to engage the transverse seat 24 of the hook-shaped arm 23. Formed on the cylindrical head portion in parallel relation with the transverse rib is a groove 40 corresponding to the rounded contour of the bar portion 25 of the loop. Also formed on the coupling head midway between the ends of the rib and extending over the groove 40 is a tongue 41 which engages within the opening of the hook-shaped loop as previously mentioned. The terminal end 42 of the tongue is spaced from the rear edge 43 of the groove a sufficient distance to provide for free passage of the bar portion of the hook-like arm so that it may be seated in the groove and engaged under the tongue as shown in Fig. 1.

In order to center the coupling members and to support the outer end of the packing ring the flat end face of the coupling member 2 has a conical shaped annulus 44 encircling the flow channel 45 therein and adapted to engage within the conical seat formed within the packing ring when the parts of the coupling are interconnected as now to be described.

In using a coupling the member 3 is threaded within the stop valve as shown in Fig. 1, while the other member is attached to the hose by sliding the end of the hose over the nipple 31 thereof and securing it by the clamp 33. The locking pin is inserted into the opening 18 by applying it from within the packing recess so that the head thereof seats within the counter-bore and the shank projects from the head in the manner of a latch. The packing ring is inserted through the open end of the packing recess so that the rounded periphery thereof engages in the rounded surface of the packing chamber. When the packing ring is inserted the inner bevelled end thereof engages over the internal rib 13. When the packing is thus applied it retains the locking pin in projected position as shown in Fig. 2.

To couple the members, the tongue 41 is passed through the opening 26 from the seat side of the hook so that it engages over the bar portion 25 thereof when the bar portion is pivotally engaged in the groove 40. When the coupling members are thus engaged the bar portion of the hook-like arm cooperates with the groove 40 and tongue 41 to form a hinge whereon the parts of the coupling may pivot when moved into abutting relation as shown in Fig. 4.

As the coupling members are brought together the cone-shaped annulus on the member 2 will enter within the recess of the packing ring to center the coupling members and support the packing ring in centered position within the packing recess. As the parts are brought into aligning registry the lug 34 will engage the locking pin to depress it within the opening 18 against the resiliency of the packing a sufficient distance so that the outer end of the lug will ride over the locking pin. When the parts are in abutting relation the locking pin registers with the opening 36, whereon the resilient character of the packing ring urges the locking pin into the recess for rigidly interlocking the coupling members in abutting relation.

When the stop valve 6 is opened, pressure of the fluid moving through the packing ring will urge the packing ring against the head of the locking pin so as to prevent any accidental displacement of the pin that might tend to release the coupling members. When it is desired to disengage the coupling members, the stop valve is closed whereupon the pressure is relieved through the hose. The thumb may then be pressed against the locking pin to effect sufficient retraction thereof to permit breaking open of the coupling members on their hinge connection. After the lug is disengaged from the locking pin and the parts are moved in the position shown in Fig. 2, the tongue of the coupling member 2 may be readily disengaged from the bar 25 of the other coupling member to disconnect the hose.

From the foregoing, it is obvious that I have provided a quick acting coupling that may be readily employed in connecting a hose or the like without the use of tools such as are necessary in various couplings employing threaded connections. It is obvious that the packing ring not only forms a seal between the coupling members but it provides means for automatically retaining the locking pin in projected position after it is engaged with the lug of the other coupling member; then, when the fluid is flowing through the coupling, the pressure thereof, acting internally within the packing ring, urges the packing ring outwardly, to not only enhance the seal between the coupling members but to prevent accidental retractive movement of the locking pin that might tend to permit unlocking of the coupling members.

While I have illustrated and described the invention as used to connect a hose with a pipe fitting it is obvious that it may be used for connection of various types of conduits and the like without departing from the spirit of the invention. It is also obvious that other methods of securing the hose section to the body of the coupling member 2 may be provided.

What I claim and desire to secure by Letters Patent is:

1. A coupling including a pair of members, interlocking means on the respective members, a resilient packing carried by one of the members and sealingly engaging with the other, and latch means on the respective members yieldingly retained in latching engagement responsive to pressure exerted against said packing.

2. A coupling including a pair of members, interlocking means on the respective members, a resilient packing carried by one of the members and engaged with the other, a latching lug on one of the members, and a latch pin on the other member yieldingly engaged by the packing to retain said latch pin in latching engagement with the latching lug.

3. A hose coupling including a pair of members, interengaging hook-shaped projections on the respective members and arranged to form a hinge connection between said members, latch means connecting the members and releasable to effect hinging movement of the members relative to each other, and means responsive to pressure of fluid flowing through the coupling for preventing release of the latch means.

4. A coupling including a pair of members, interengaging hook-shaped arms on the respective members and arranged to form a hinge connection between said members, a resilient packing carried by one of the members and sealingly engaged with the other, a latch lug on one of the members, and a latch pin on the other member yieldingly retained in projected position to engage the latch lug responsive to pressure applied to the packing.

5. A coupling including a pair of members, a hook-shaped loop on one of the members, a hook on the other member engaging in said hook-shaped loop to provide an interlocking connection between said members, means forming a part of said interlocking connection for preventing rotative movement of the members relatively to each other, latch means connecting the members, and means responsive to pressure of fluid flowing through the coupling for retaining the latch means in engaging position.

6. A coupling including a pair of members one of which has a packing chamber, a hook-shaped loop on one of the members, a hook on the other member engaging in said hook-shaped loop to provide a hinge connection between said members, a packing in said packing chamber, a latch pin slidable in the member having the packing chamber and having a head engaging said packing, and a latch lug on the other member engageable with said latch pin to prevent hinging movement of said members.

7. A coupling including a pair of tubular members, intercoupling means for the tubular members including locking means movable on one of the tubular members, and cooperative engaging means on the other tubular member, and packing means between the pair of tubular members and having engagement with the locking means and movable responsive to pressure of fluid flowing through the tubular members to retain said locking means in locking engagement with said cooperative means on the other tubular member.

CHESTER B. KENNEDY.